United States Patent
Lee et al.

(10) Patent No.: US 9,796,374 B2
(45) Date of Patent: Oct. 24, 2017

(54) OVERHEAT PREVENTION METHOD FOR TRANSMISSION CLUTCH

(71) Applicants: Hyundai Motor Company, Seoul (KR); KIA Motors Corporation, Seoul (KR)

(72) Inventors: Chang Min Lee, Anyang-si (KR); Sung Chan Na, Seoul (KR); Kwon Chae Chung, Gwangmyeong-si (KR); Jun Geol Song, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/197,426

(22) Filed: Jun. 29, 2016

(65) Prior Publication Data

US 2017/0259804 A1   Sep. 14, 2017

(30) Foreign Application Priority Data

Mar. 14, 2016   (KR) .......................... 10-2016-0030343

(51) Int. Cl.
*B60W 10/08* (2006.01)
*B60W 20/13* (2016.01)
(Continued)

(52) U.S. Cl.
CPC ............... *B60W 20/13* (2016.01); *B60K 6/26* (2013.01); *B60K 6/387* (2013.01);
(Continued)

(58) Field of Classification Search
None
See application file for complete search history.

(56) References Cited

U.S. PATENT DOCUMENTS

| 6,808,470 B2 * | 10/2004 | Boll | B60K 6/442 |
| | | | 180/65.23 |
| 7,686,112 B2 * | 3/2010 | Shiiba | B60K 6/48 |
| | | | 180/65.21 |

(Continued)

FOREIGN PATENT DOCUMENTS

| JP | 2013-139244 A | 7/2013 |
| JP | 2013-248995 A | 12/2013 |

(Continued)

OTHER PUBLICATIONS

Korean Notice of Allowance dated Mar. 1, 2017, issued in Korean patent application No. 10-2016-0030343.

*Primary Examiner* — Dirk Wright
(74) *Attorney, Agent, or Firm* — McDermott Will & Emery LLP

(57) ABSTRACT

An overheat prevention method includes an rpm comparison step of comparing an engine revolution per minute (rpm) speed with a preset rpm speed by a controller when requiring an engagement of an engine clutch, a temperature comparison step of comparing a temperature of a transmission clutch with a preset temperature by the controller when it is determined that the engine rpm speed is less than the preset rpm speed at the rpm comparison step, and a serial drive mode control step of releasing the engine clutch and engaging the transmission clutch, and controlling a hybrid starter generator (HSG) to charge a battery using engine power to provide driving power to a motor by the controller when it is determined that the temperature of the transmission clutch is higher than the preset temperature at the temperature comparison step.

6 Claims, 3 Drawing Sheets

(51) Int. Cl.
*B60W 10/02* (2006.01)
*B60W 10/06* (2006.01)
*B60K 6/387* (2007.10)
*B60K 6/26* (2007.10)
*B60L 11/18* (2006.01)

(52) U.S. Cl.
CPC .......... *B60L 11/1861* (2013.01); *B60W 10/02* (2013.01); *B60W 10/06* (2013.01); *B60W 10/08* (2013.01); *B60W 2510/0291* (2013.01); *B60W 2510/0638* (2013.01); *B60W 2510/244* (2013.01); *B60W 2710/021* (2013.01); *B60W 2710/025* (2013.01); *B60Y 2200/92* (2013.01); *B60Y 2400/42* (2013.01); *Y10S 903/914* (2013.01); *Y10S 903/915* (2013.01)

(56) References Cited

U.S. PATENT DOCUMENTS

| | | | | |
|---|---|---|---|---|
| 7,708,095 | B2* | 5/2010 | Hirata | B60K 6/365 |
| | | | | 180/65.21 |
| 8,065,047 | B2* | 11/2011 | Hasegawa | B60K 6/48 |
| | | | | 701/22 |

FOREIGN PATENT DOCUMENTS

| | | | |
|---|---|---|---|
| KR | 10-2010-0109421 | A | 10/2010 |
| KR | 10-2013-0066160 | A | 6/2013 |
| KR | 10-1518900 | B1 | 5/2015 |
| KR | 10-1519297 | B1 | 5/2015 |
| KR | 10-1550637 | B1 | 9/2015 |

\* cited by examiner

OVERHEAT PREVENTION METHOD FOR TRANSMISSION CLUTCH

CROSS REFERENCE TO RELATED APPLICATION

The present application claims the benefit of priority to Korean Patent Application No. 10-2016-0030343, filed Mar. 14, 2016 with the Korean Intellectual Property Office, the entire contents of which is incorporated herein for all purposes by this reference.

TECHNICAL FIELD

The present disclosure relates to an overheat prevention method for a transmission clutch, to avoid a situation which driving becomes impossible due to overheating of a transmission clutch of a hybrid vehicle.

BACKGROUND

Generally, interest in hybrid vehicles has increased due to a demand for improving fuel efficiency and due to the need to comply with enhanced regulations for vehicle exhaust gases.

In particular, a transmission-mounted electric device (TMED) type hybrid vehicle includes at least one motor and one engine. The vehicle may further include: a battery stored with high voltage electricity for driving the motor; an inverter for converting a DC voltage to an AC voltage; and a clutch arranged between the engine and the motor to transmit the power of the engine to a drive shaft.

The TIED type hybrid vehicle engages or releases an engine clutch during driving in a hybrid electric vehicle (HEV) mode or an electric vehicle (EV) mode according to acceleration/deceleration, a load, vehicle speed, a state of charge (SOC) of the battery, etc., all of which are determined through an operation of an accelerator pedal and a brake pedal that both may be manipulated by a driver.

For example, if a situation in which the battery charge is limited occurs while a hybrid vehicle is driven in the EV mode, an engine clutch may be engaged to perform the HEV drive mode in which the engine power is used.

In order to engage and maintain the engaged state of the engine clutch, the engine should remain at an idle revolution per minute (rpm) speed. However, when the vehicle is driven in a highly-loaded condition such as uphill driving and is driven at a low speed, it is impossible to maintain the engine at the idle rpm. Herein, a transmission clutch may be controlled to slip, thereby maintaining a lock-up state of the engine rpm and the engine clutch.

However, when the slip occurs consistently on the transmission clutch due to continuous driving in a highly-loaded condition, the transmission clutch may be damaged by heat caused by the slip.

In the related art, to prevent thermal damage to the transmission clutch, the transmission clutch may be disengaged. However, there is a problem that the driver cannot drive the vehicle, and therefore, a vehicle travelling performance is degraded when the clutch disengages.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made in consideration of the above problems occurring in the related art, and the present disclosure is intended to propose an overheat prevention method for a transmission clutch, in which the method prevents overheating of the transmission clutch by performing an HSG serial drive mode according to a temperature of the transmission clutch when an engagement of an engine clutch is required.

In order to achieve the above object, according to one aspect of the present disclosure, there is provided an overheat prevention method for a transmission clutch, the overheat prevention method may include: an rpm comparison step of comparing an engine rpm speed with a preset rpm speed by a controller when requiring an engagement of an engine clutch; a temperature comparison step of comparing a temperature of a transmission clutch with a preset temperature by the controller when it is determined that the engine rpm speed is less than the preset rpm speed at the rpm comparison step; and a serial drive mode control step of releasing the engine clutch and engaging the transmission clutch, and controlling a hybrid starter generator (HSG) to charge a battery using engine power to provide driving power to a motor by the controller when it is determined that the temperature of the transmission clutch is higher than the preset temperature at the temperature comparison step.

The overheat prevention method may further include an engine clutch engagement step of engaging the engine clutch by the controller when it is determined that the engine rpm is not less than the preset rpm at the rpm comparison step.

The overheat prevention method may further include a transmission clutch slip control step of engaging the engine clutch and controlling the transmission clutch to slip by the controller when it is determined that the temperature of the transmission clutch is not higher than the preset temperature at the temperature comparison step.

The overheat prevention method may further include a state of charge (SOC) comparison step of comparing an SOC of the battery with a preset SOC by the controller before the rpm comparison step, wherein when it is determined that the SOC of the battery is less than the preset SOC at the SOC comparison step, the controller determines that engagement of the engine clutch is required and performs the rpm comparison step.

The overheat prevention method may further include an engine clutch release step of releasing the engine clutch by the controller when it is determined that the SOC of the battery is not less than the preset SOC at the SOC comparison step.

The overheat prevention method may perform again the SOC comparison step by the controller after the serial drive mode control step.

According to the above-mentioned overheat prevention method for a transmission clutch, it is possible to prevent a situation in which the vehicle cannot be driven due to overheating of the transmission clutch, thereby improving merchantability of a vehicle.

Also, since the overheat prevention method of the present disclosure prevents damage to the transmission clutch due to overheating, robustness of vehicle parts are improved and repair costs may be reduced.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Hereinbelow, an overheat prevention method for a transmission clutch according to an exemplary embodiment of the present disclosure will be described in detail with reference to the accompanying drawings.

Figure 1:
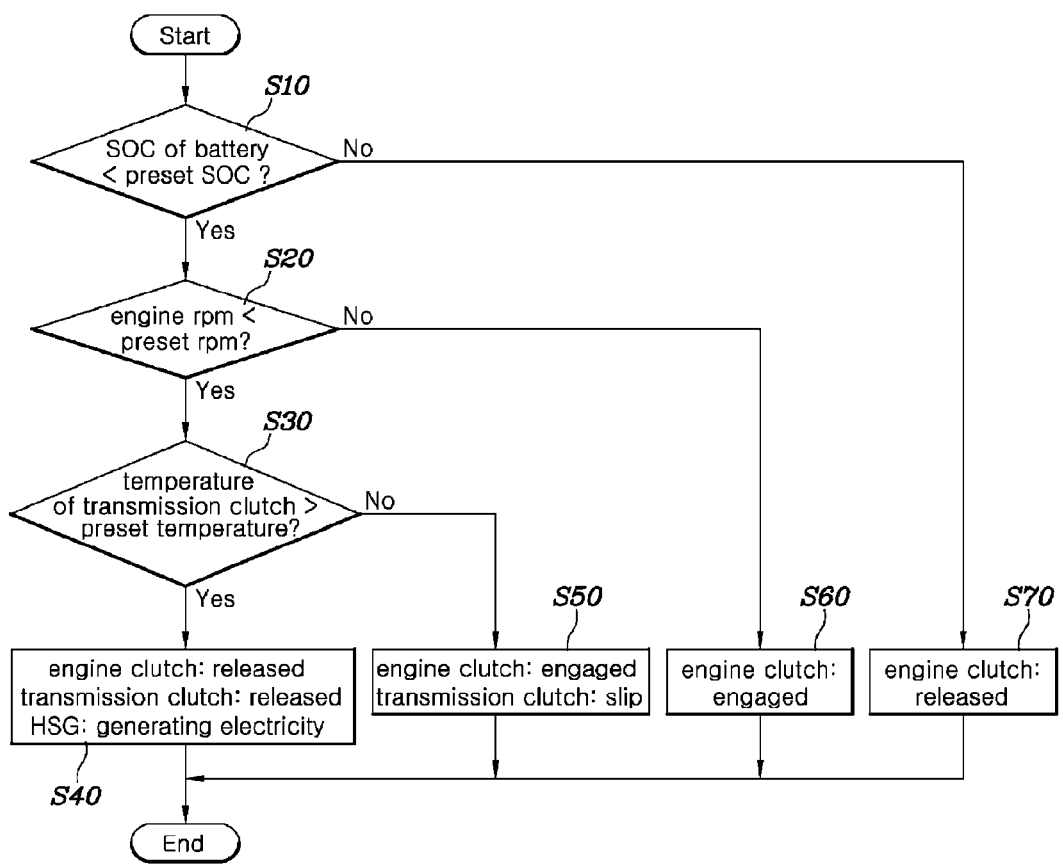
FIG. 1 is a flowchart of an overheat prevention method for a transmission clutch according to an exemplary embodiment of the present disclosure.

FIG. 1 is a flowchart of an overheat prevention method according to an exemplary embodiment of the present disclosure. Referring to FIG. 1, an overheat prevention method for a transmission clutch may include an rpm comparison step S20 of comparing an engine rpm with a preset rpm by a controller when requiring engagement of engine clutch, a temperature comparison step S30 of comparing a temperature of a transmission clutch with a preset temperature by the controller when it is determined that the engine rpm is less than the preset rpm at the rpm comparison step S20, and a serial drive mode control step S40 of releasing the engine clutch and engaging the transmission clutch, and controlling a hybrid starter generator (HSG) to charge a battery using engine power to provide driving power to a motor by the controller when it is determined that the temperature of the transmission clutch is higher than the preset temperature at the temperature comparison step S30.

In other words, when engagement of the engine clutch is required, the controller may determine whether the hybrid vehicle is being driven in a highly-loaded condition by using the engine rpm and an overheat degree of the transmission clutch based on a temperature of the transmission clutch.

When the vehicle is being driven in a highly-loaded condition and the transmission clutch is determined as being overheated, the controller, as described above, may release the engine clutch and engage the transmission clutch, and control the HSG to charge the battery using the engine power to operate the motor coupled to a drive shaft using the charged electricity. Accordingly, it may not be necessary to control the transmission clutch to slip to maintain the engine at an idle rpm speed, thus overheating that may be caused by controlling the transmission clutch to slip may be prevented.

Herein, the preset rpm is set as being higher than the idle rpm such that the engine rpm is not lowered to less than the idle rpm when the engine clutch is engaged.

Also, the preset temperature may be set to a temperature at which the transmission clutch is damaged or the performance thereof is degraded. However, the above preset rpm and the preset temperature are variably set according to a vehicle and/or other variables, so the preset rpm and the preset temperature are not set to fixed levels.

Figure 2:
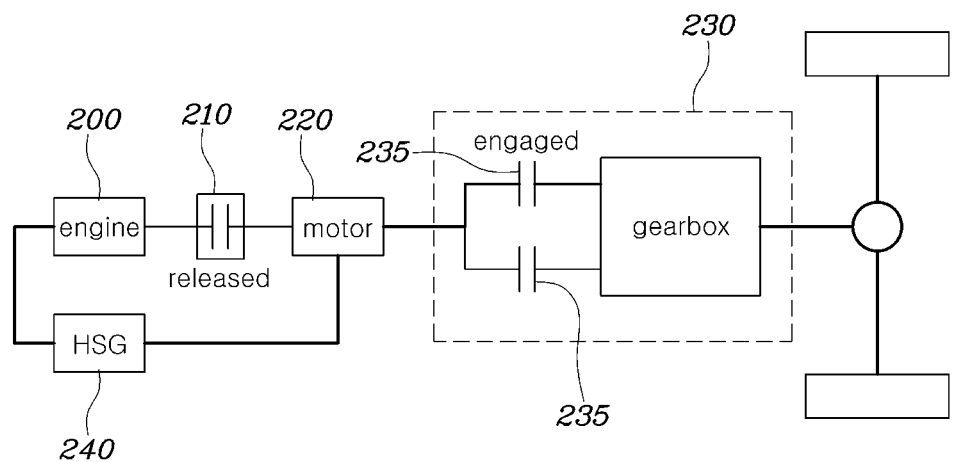
FIG. 2 is a view illustrating a power transmission of a vehicle at a serial drive mode control step of an embodiment the present disclosure.

In detail, FIG. 2 is a view illustrating a power transmission of a vehicle at a serial drive mode control step of an embodiment of the present disclosure. Referring to FIGS. 1 and 2, the controller (not shown) may release the engine clutch 210 at the serial drive mode control step S40, and control the HSG 240 to generate electricity using the power of the engine 200, and to transmit the power of the engine 200 to the motor 220 by transmitting driving power to the motor 220 by using the generated electricity. Therefore, a launch performance in a highly-loaded driving situation, in which the engine clutch cannot be engaged, may decrease, but the engine power may be transmitted to vehicle wheels without slipping the transmission clutch 235 since the power is transmitted to the vehicle wheels via the HSG 240.

Herein, the controller may be a hybrid control unit (HCU) which may be a master controller outranking a transmission control unit (TCU), an engine control unit (ECU) and/or an electronic control unit, etc. In other words, the controller may control the engine operation and engagement/release of the engine clutch 210 by using the engine control unit, control whether the HSG generates electricity or not and an operation of the motor 220 by using the electronic control unit, and control the engagement/release of a transmission 230 and an inside transmission clutch by using the transmission control unit.

Meanwhile, the present disclosure may further include an engine clutch engagement step S60 that engages the engine clutch by the controller when it is determined that the engine rpm speed is not less than the preset rpm at the rpm comparison step S20. In other words, the controller may determine that the engine rpm is equal to or higher than the preset rpm and that the vehicle is not being driven in a highly-loaded condition in which the engine rpm is lowered to less than the idle rpm. Thus, the controller may engage the engine clutch 210.

Figure 3:
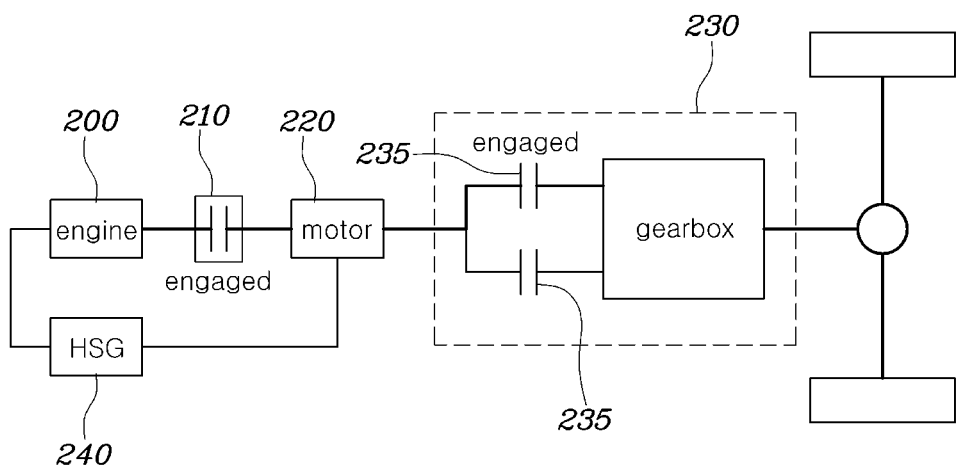
FIG. 3 is a view illustrating a power transmission of a vehicle at an engine clutch engagement step of an embodiment of the present disclosure

FIG. 3 is a view illustrating a power transmission of a vehicle at an engine clutch engagement step of an embodiment of the present disclosure. Referring to FIG. 3, power of the engine 200 and power of the motor 220 may be directly transmitted to a driving wheel via the transmission 230 by engaging the engine clutch 210 at the engine clutch engagement step S60. Therefore, power loss of the engine 200 and the motor 220 may be minimized.

In addition, the present disclosure may further include a transmission clutch slip control step S50 which may engage the engine clutch and control the transmission clutch to slip by the controller when it is determined that the temperature of the transmission clutch is not higher than the preset temperature at the temperature comparison step S30. In other words, the controller may engage the engine clutch when it determines that the transmission clutch is not overheated, while the controller controls the transmission clutch to slip to maintain a lock-up state of the engine clutch such that the vehicle is not stalled due to a lowered engine rpm.

Figure 4:
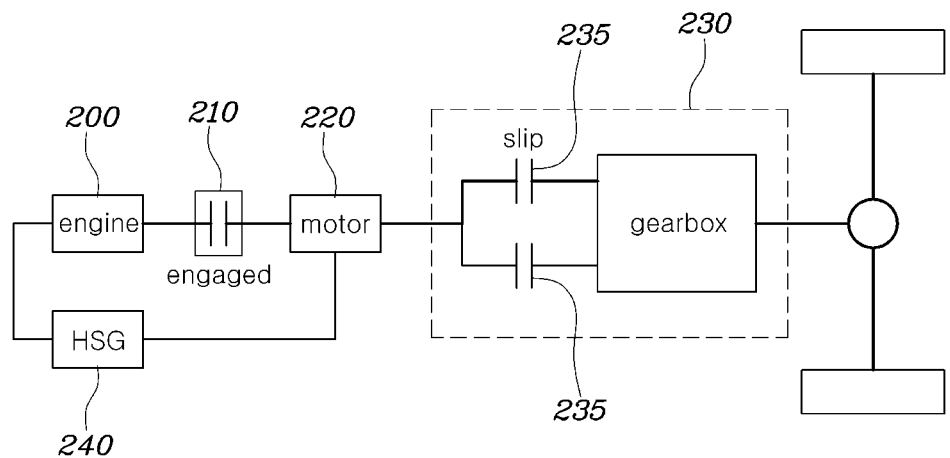
FIG. 4 is a view illustrating a power transmission of a vehicle at a transmission clutch slip control step of an embodiment of the present disclosure.
Figure 5:
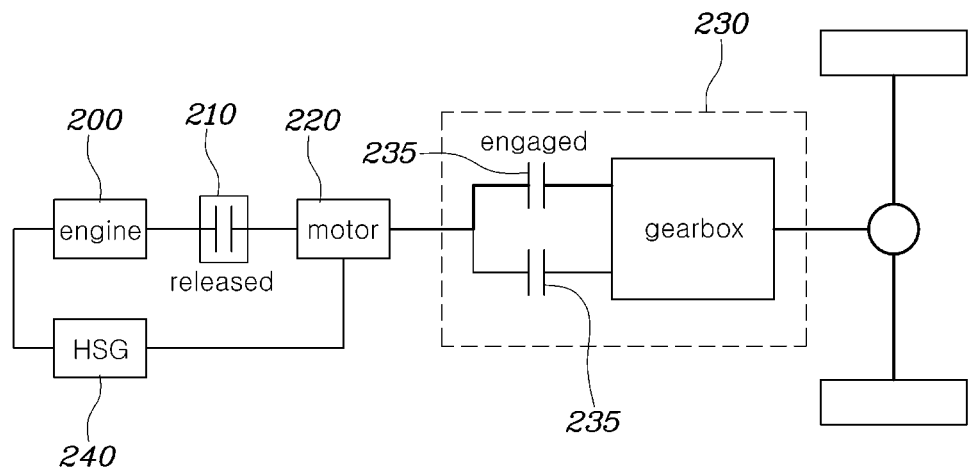
FIG. 5 is a view illustrating a power transmission of the vehicle at an engine clutch release step of an embodiment of the present disclosure.

FIG. 4 is a view illustrating a power transmission of a vehicle at a transmission clutch slip control step of an embodiment of the present disclosure. Referring to FIG. 4, at the transmission clutch slip control step S50, the controller may engage the engine clutch and directly connect the engine 200 to the driving shaft. However, the controller may prevent the engine from stalling by preventing the degradation of the engine rpm to be less than the idle rpm by controlling the transmission clutch 235 to slip.

Meanwhile, the present disclosure may further include a SOC comparison step S10 that compares a state of charge (SOC) of the battery with a preset SOC by the controller before the rpm comparison step S20, and the controller may determine that the engagement of the engine clutch is required and may perform the rpm comparison step S20 when it is determined that the SOC of the battery is less than the preset SOC at the SOC comparison step S10.

In other words, the hybrid vehicle may be driven in an EV mode or a HEV mode according to a remaining SOC of the battery, and when the SOC of the battery is less than the preset SOC, the vehicle may be limited to being driven by only the motor. In this case, it may be preferable to add the engine power to the driving shaft by engaging the engine clutch.

Therefore, when of the SOC of the battery is not sufficient, the driving mode of the vehicle may be changed to the HEV mode, thereby, a battery discharge phenomenon may be prevented and a situation in which the vehicle cannot be driven may be prevented.

When it is determined that the SOC of the battery is more than the preset SOC at the SOC comparison step S10, the controller may perform an engine release step S70 which releases the engine clutch. In other words, when the SOC of the battery that operates the motor is sufficient, it may be preferable to maintain the engine clutch released to maintain the EV mode. Therefore, the vehicle may be driven by only the motor. Thus, fuel efficiency may be improved by preventing consumption of the fuel by an operation of the engine.

In addition, the present disclosure may perform the SOC comparison step S10 by the controller again after the serial drive mode control step S40.

When the hybrid vehicle is driven in a serial mode based on the HSG, it may be preferable to prepare an optimized driving mode by implementing a logic that detects a SOC of the motor battery, an engine rpm, and a temperature of a transmission clutch again, since a launch performance may be degraded compared to other driving modes.

According to an overheat prevention method for a transmission clutch with a structure as described above, merchantability of a vehicle is improved by preventing a situation in which the vehicle cannot be driven due to a transmission clutch overheating.

Also, since damage due to the transmission clutch overheating may be prevented, a robustness of vehicle parts is improved and therefore, repair costs may be reduced.

Although an embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. An overheat prevention method comprising:
    an rpm comparison step of comparing an engine revolution per minute (rpm) speed with a preset rpm speed by a controller when requiring an engagement of an engine clutch;
    a temperature comparison step of comparing a temperature of a transmission clutch with a preset temperature by the controller when it is determined that the engine rpm speed is less than the preset rpm speed at the rpm comparison step; and
    a serial drive mode control step of releasing the engine clutch and engaging the transmission clutch, and controlling a hybrid starter generator (HSG) to charge a battery using engine power to provide driving power to a motor by the controller when it is determined that the temperature of the transmission clutch is higher than the preset temperature at the temperature comparison step.

2. The method of claim 1, further comprising an engine clutch engagement step of engaging the engine clutch by the controller when it is determined that the engine rpm is higher than the preset rpm at the rpm comparison step.

3. The method of claim 1, further comprising a transmission clutch slip control step of engaging the engine clutch and controlling the transmission clutch to slip by the controller when it is determined that the temperature of the transmission clutch is not higher than the preset temperature at the temperature comparison step.

4. The method of claim 1, further comprising a state of charge (SOC) comparison step of comparing an SOC of the battery with a preset SOC by the controller before the rpm comparison step, wherein when it is determined that the SOC of the battery is less than the preset SOC at the SOC comparison step, the controller determines that engagement of the engine clutch is required, and performs the rpm comparison step.

5. The method of claim 4, further comprising an engine clutch release step of releasing the engine clutch by the controller when it is determined that the SOC of the battery is not less than the preset SOC at the SOC comparison step.

6. The method of claim 4, wherein the controller performs the SOC comparison step again after the serial drive mode control step.

* * * * *